United States Patent [19]

Wong et al.

[11] Patent Number: 4,651,154
[45] Date of Patent: Mar. 17, 1987

[54] DIGITAL NAVSTAR RECEIVER

[75] Inventors: Andrew C. Wong, Harlow; Graham R. Fearnhead, Chelmsford; Simon J. Gale, Bishop's Stortford, all of United Kingdom

[73] Assignee: Standard Telephone and Cables Public Limited Company, London, England

[21] Appl. No.: 706,310

[22] Filed: Feb. 27, 1985

[30] Foreign Application Priority Data

Mar. 1, 1984 [GB] United Kingdom ............... 8405386

[51] Int. Cl.⁴ ...................... H04B 7/19; H04R 7/185
[52] U.S. Cl. .................................... 342/356; 342/358
[58] Field of Search ............................ 343/356–358, 343/5 NQ; 364/459; 375/1

[56] References Cited

U.S. PATENT DOCUMENTS 3,755,816  8/1973  Kratzer .

4,539,565  9/1985  Norsworthy ................ 343/5 NQ

FOREIGN PATENT DOCUMENTS 0079689  5/1983  European Pat. Off. .
0083480  7/1983  European Pat. Off. .

Primary Examiner—Theodore M. Blum
Assistant Examiner—Gregory C. Issing
Attorney, Agent, or Firm—Kerkam, Stowell, Kondracki & Clarke

[57] ABSTRACT

A NAVSTAR receiver in which the received signals are processed to produce digitized quadrature signals at zero i.f. Baseband phasor rotation to effect Doppler tracking in the receiver loop is accomplished by deriving digital signals representing $\sin \omega T$ and $\cos \omega T$ for the required rotation angle $\omega T$, multiplying the quadrature signals separately and summing the outputs according to the algorithm $I^1 = I \cos \omega T + Q \sin \omega T$ and $Q^1 = Q \cos \omega T - I \sin \omega T$, where I & Q are the digitized quadrature signals.

5 Claims, 6 Drawing Figures $(X_1 - U_X)^2 + (Y_1 - U_Y)^2 + (Z_1 - U_Z)^2 = (R_1 - C_B)^2$
$(X_2 - U_X)^2 + (Y_2 - U_Y)^2 + (Z_2 - U_Z)^2 = (R_2 - C_B)^2$
$(X_3 - U_X)^2 + (Y_3 - U_Y)^2 + (Z_3 - U_Z)^2 = (R_3 - C_B)^2$
$(X_4 - U_X)^2 + (Y_4 - U_Y)^2 + (Z_4 - U_Z)^2 = (R_4 - C_B)^2$

DIGITAL NAVSTAR RECEIVER

BACKGROUND OF THE INVENTION

This invention relates to receivers for the Navstar satellite navigation system.

Navstar is a satellite navigation system which is planned to give continuous worldwide all-weather coverage, providing highly accurate, three-dimensional position and velocity information.

The complete Navstar system is planned to consist of 18 satellites arranged in nearly circular orbits with radii of 26,600 km, and an inclination to the earth's equatorial plane of 55 degrees. Each satellite transmits two navigation signals, designated L1 and L2 and centred at 1575 and 1228 MHz respectively.

Both signals convey ranging information by means of modulations which are locked in time to atomic standards. The forms of these modulations (which are known as pseudorandom codes because they appear random, but are nevertheless well defined) are unique to each satellite.

By measuring the phases of the received codes against a clock in the receiver, together with the Doppler shifts of the radio frequency carriers, a user can calculate the range and range rate to a particular satellite by monitoring four satellites (FIG. 1). By decoding data about their motions which are also modulated on to the transmitted signals, the user may solve equations (FIG. 2) to determine his three-dimensional position and velocity and also apply corrections to his clock, making it conform to satellite time.

Alternatively, if he is constrained to move on the surface of the earth or is at known altitude, he may make two-dimensional measurements using three satellites. The software controlling the receiver must choose from the satellites in view the subset which gives the most favourable geometry for the navigational calculations.

Two pseudorandom codes are in fact transmitted by each satellite. The first of these is used to aid acquisition of the satellite signals and to provide coarse navigation, and hence is called the Coarse/Acquisition (C/A) code. The second has a 10-times higher modulation rate which yields the full navigational accuracy of the system, and is designated the Precision (P) code.

.A basic Navstar receiver typically contains a low-noise amplifier and down-converter to a convenient IF, followed by one or more code and carrier tracking channels, each capable of tracking the transmissions from any satellite. There is also associated range and range-rate measurement circuits.

The purpose of the code tracking loop is to keep a code generator in the receiver in step with a received pseudorandom sequence, and hence provide information on the range to the satellite being tracked.

To obtain a position and velocity estimation, a receiver must be locked to the transmissions from a number of satellites. Consider the case of a complete three-dimensional estimation for which the required number is four, as depicted in FIG. 1. Four measurements of "pseudo-range" are made by locking code tracking loops to the received signals and then timing the occurrence of certain states of the code generators within the loops with the aid of the receiver's clock. The measurements are of "pseudo-range" rather than true range because of the (as yet) undetermined receiver clock offset.

Similarly, by measuring the frequencies of the carrier tracking loop voltage-controlled oscillators over gating times determined by the receiver clock, four measurements of "pseudo-range rate" are obtained. These are in error from the true range rates because of the clock's frequency error. All these measurements, together with data from each satellite which provides information about satellite motion, then enable a navigational solution to be obtained. This relies on the fact that four observations are required to solve for four unknowns.

SUMMARY OF THE INVENTION

According to the present invention there is provided a receiver for a Navstar satellite navigation system including amplification and down conversion to i.f. frequencies to produce quadrature signals, analogue-to-digital converters to digitise separately the quadrature signals, local digital code generating means, means for correlating the digitised quadrature signals separately with the same locally generated digital codes, channel signal processing means to which the outputs of the correlation means are applied, the processing means being arranged to control the code and carrier tracking of the receiver, and correction means responsive to control signals generated in the processing means to effect phase rotation of the baseband signal phasor represented by the digitised quadrature signals to effect Doppler tracking in the receiver loop, the correction means including means for generating digital signals representing sin $\omega T$ and cos $\omega T$, where $\omega T$ is the required phase rotation angle, means for multiplying each of the quadrature signals by the sin $\omega T$ and cos $\omega T$ signals separately and means for summing the multiplied signals according to the algorithm $$I^1 = I\cos\omega T + Q\sin\omega T$$

$$Q^1 = Q\cos\omega T - I\sin\omega T$$

where I and Q are the digitised quadrature signals.

BRIEF DESCRIPTION OF THE DRAWINGS

In the drawings:

FIG. 3 shows a generalised Navstar receiver architecture. Signal is taken in at L-band and passed through successive stages of amplification and down-conversion at r.f., i.f. and zero i.f. frequencies. At some point in the chain, the signal will have to go through an analogue to digital interface, to allow information extraction by a digital processor. If the code and carrier loops are closed in software, this processor would also provide the necessary feedback control signals.

There are a number of possible positions at which code and carrier (Doppler) injection can take place: at i.f. baseband analogue, or baseband digital. Beyond the injection point in the receiver chain, the circuit becomes dedicated to the reception of signals from a particular satellite. Hence, for reception of transmissions from several satellites, the circuitry after this point has to be duplicated by the number of satellites intended, or alternatively, be time-shared (cycled or multiplexed) between the same number. Therefore, in order to reduce circuit complexity, the injection point should be pushed as far back in the chain as possible. The furthest point that this process can be effected is by performing both code correlation and Doppler correction at digital baseband.

Other considerations can also be put forward to favour a baseband solution. By performing code correlation at baseband, true multipliers can be used instead of mixers, thus avoiding the problem of mixer leakages. The stability and Q-factor of the filters required to define the pre-correlation bandwidth would demand quite stringent specifications at i.f. The problem is considerably eased by performing low-pass filtering at baseband. Also, the need to use multiple transfer loops in the synthesiser to implement i.f. Doppler injection can be avoided.

The possibility of providing digital Doppler correction at baseband is highly desirable as this will permit the use of a single fixed frequency down-conversion to zero i.f. followed by a single pair of A/D converters, irrespective of the number of receiver channels required.

Figure 1:
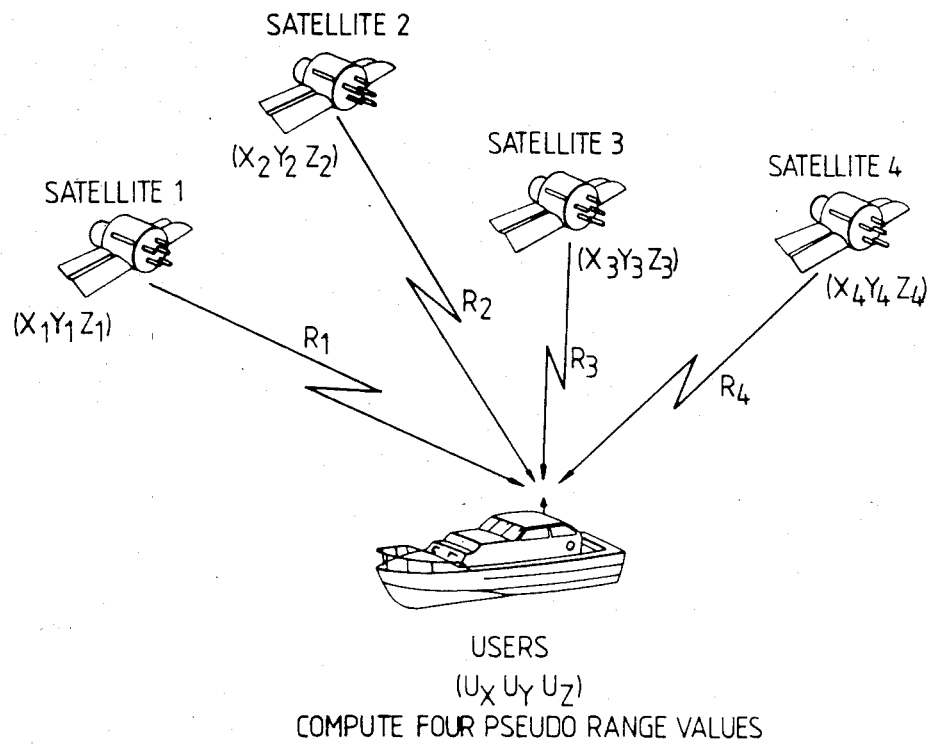
FIG. 1 illustrates the NAVSTAR satellite navigation system.
Figure 1:
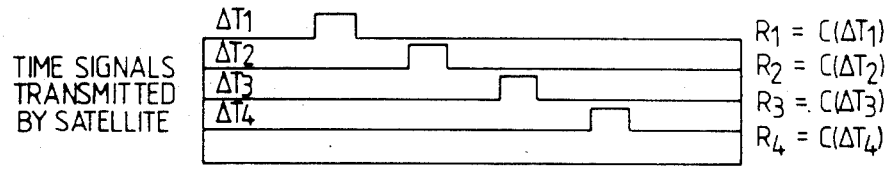
Figures 2, 3:
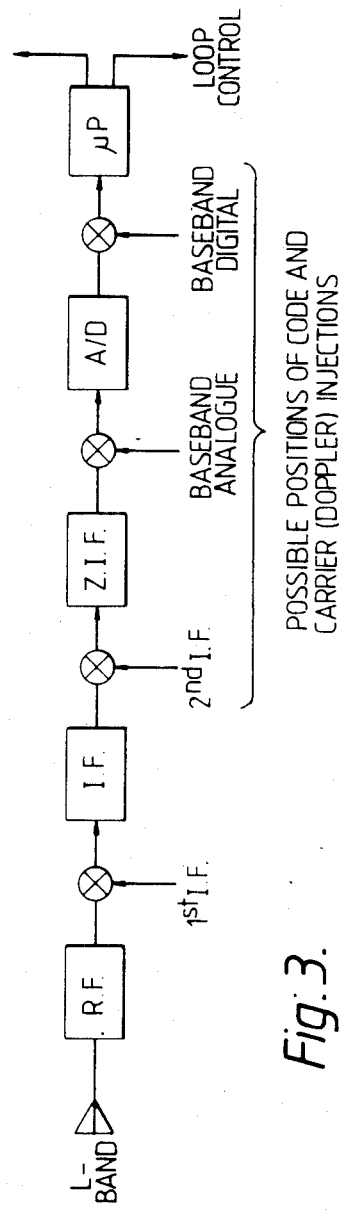
FIG. 2 gives the equations required to be solved by a user of the NAVSTAR system.
FIG. 3 illustrates a generalised NAVSTAR receiver architecture.
Figure 4:
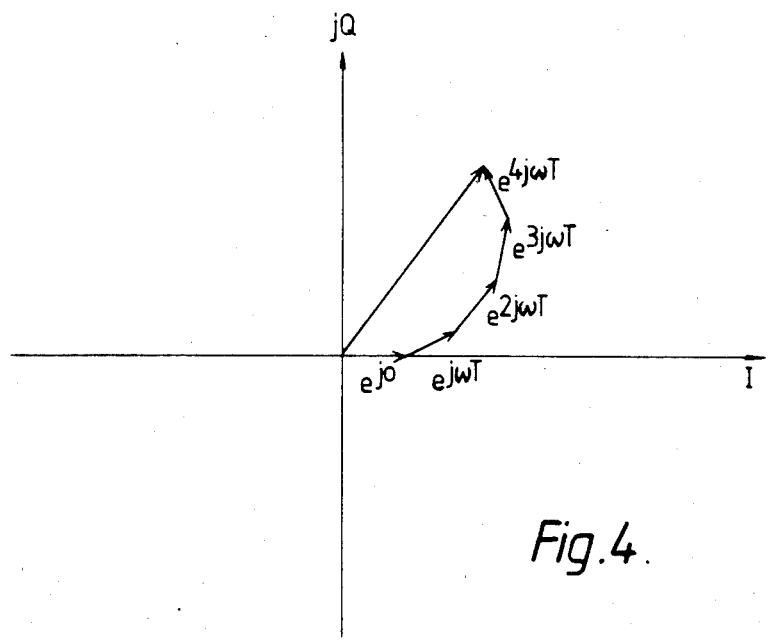
FIG. 4 illustrates the effect of Doppler shift.

In order to represent the signal phasor at baseband, In-phase (I) and Quadrature (Q) channels are necessary with the I and Q channels denoting the real and imaginary components of the phasor. Any Doppler shift will cause the phasor to rotate and so produce a Doppler loss if filtering is implemented by accumulation of successive phasor samples. This effect is shown in FIG. 4. The rotation must therefore be removed or considerably reduced before appreciable accumulation may take place.

The signal vector may be expressed in exponential form thus:

$$\hat{S} = Ae^{j(\omega NT + \phi)}$$

$$N = 0, 1, 2 \ldots$$

where A is the signal amplitude, $\omega$ is the Doppler frequency, T the sample interval, and $\phi$ is an arbitrary angle.

In order to remove the phase rotation, the signal vector must be multiplied by a counter-rotating unit vector thus:

$$\hat{S}' = Ae^{j(\omega NT + \phi)} \cdot e^{-j\omega NT} = Ae^{j\phi}$$

The phasor will now appear to be stationary and may be accumulated in time without loss.

The practical implementation of the counter-rotation function on the I and Q channels may be easily appreciated by expressing the multiplication in real and imaginary parts thus:

$$(I + jQ)(\cos\omega NT - j\sin\omega NT) =$$

$$\underbrace{I\cos\omega NT + Q\sin\omega NT}_{I'} + \underbrace{jQ\cos\omega NT - jI\sin\omega NT}_{Q'}$$

Figure 5:
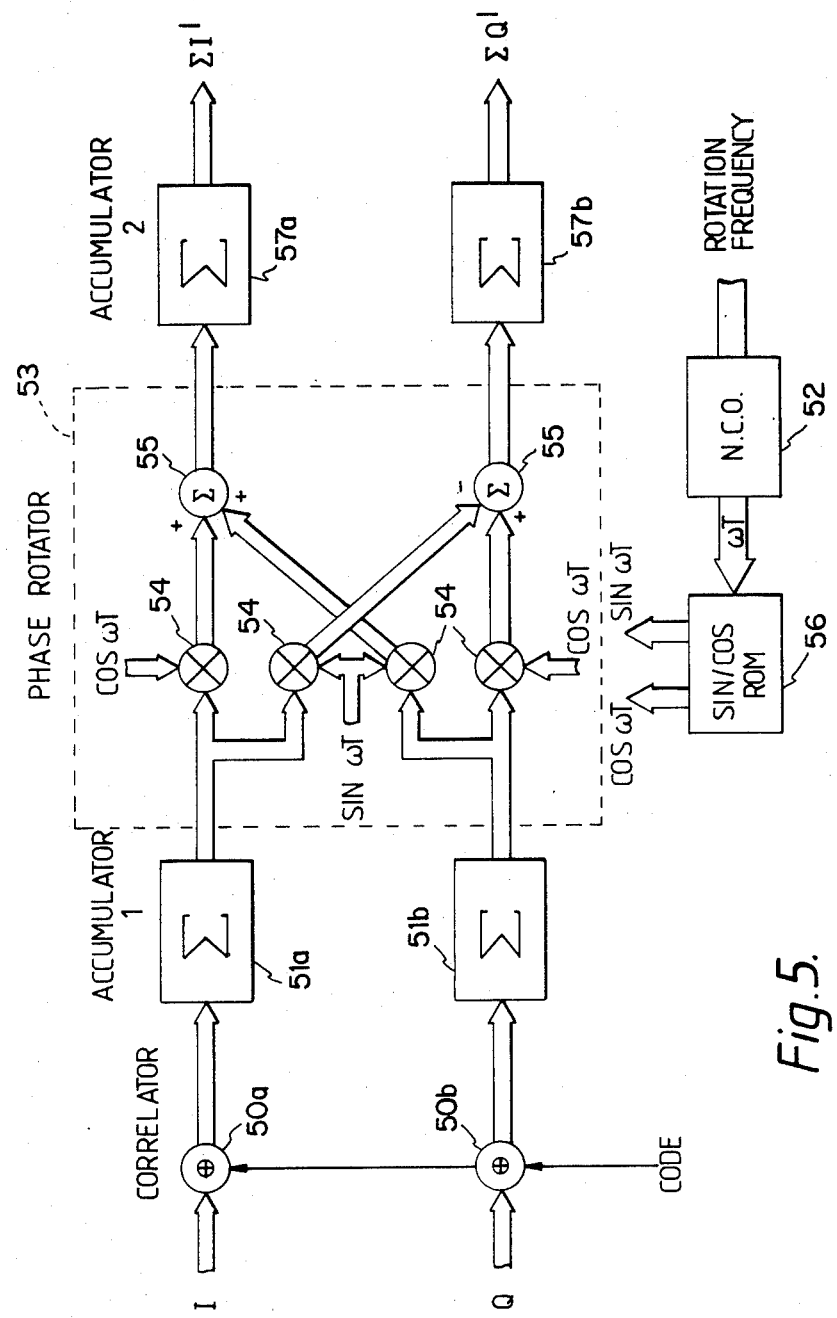
FIG. 5 illustrates a phase rotation circuit.
Figure 6:
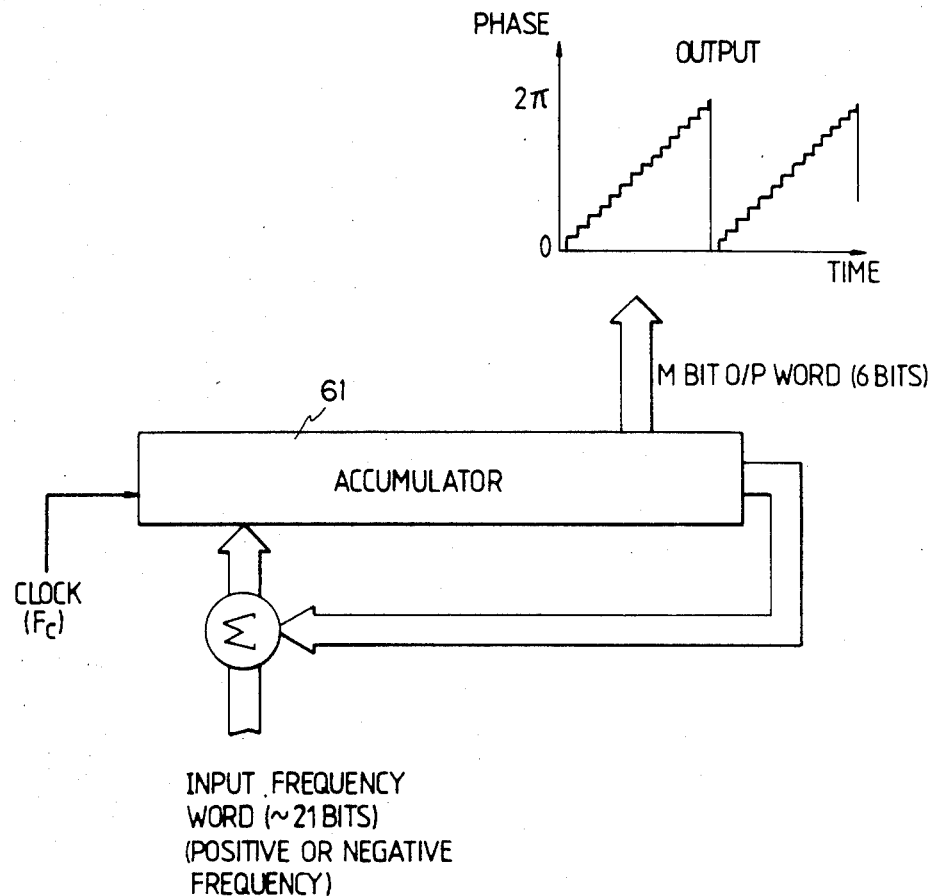
FIG. 6 illustrates a numerically controlled oscillator.

The transformation is effected by the circuit arrangement shown in FIG. 5. The digitised quadrature signals I & Q, representing the real and imaginary components of the phasor, are first fed to respective correlators 50a, 50b where they are correlated with locally generated code signals. The correlated signals are then subjected to partial accumulation in accumulators 51a, 51b to reduce the data rate before feeding to the phase rotation circuitry. The channel processor (not shown) calculates the rotation frequency to be applied to correct the Doppler loss in the received signal. This rotation frequency is fed to a numerically controlled oscillator (NCO) 52 which derives a phase rotation angle $\omega T$ required to effect the necessary phase rotation of the signal vector. The NCO is conveniently of the form shown in FIG. 6 and comprises a clocked shift register 61 acting as an accumulator to which is fed a digital word, say $\approx 21$ bits (representing a positive or a negative rotation frequency). The accumulator has a feedback summed with the input. The phase rotation angle is represented by a shorter M-bit digital word, say 6 bits) taken from an intermediate stage of the accumulator. The word length required will be determined by the maximum phase noise that may be tolerated from the rotation operation. The resultant phase noise will be given by evaluation of the rms quantisation noise. If 6 bits are used a phase quantisation of 0.098 radians will result with an associated rms phase noise, $\sigma_\phi$, of:

$$\sigma_\phi^2 = 0.098^2/12$$

giving $\sigma_{100} = 0.028$ rad. rms.

This value will typically be well below the thermal noise expected in Navstar phase tracking loops.

The frequency range and resolution of the NCO must be adequate to cover the complete expected Doppler range in steps small enough to prevent significant phase errors accumulating between NCO updates. A Doppler range of $\pm 10$ kHz will be more than adequate as this will encompass the full satellite Doppler range of $\approx \pm 4$ kHz together with a user velocity range of $\pm$Mach 3.8. In considering the frequency resolution of the device it may be assumed that the NCO will be updated at an effective rate of approximately twice the loop bandwidth. Thus for a narrow bandwidth case with an update rate of about 1 Hz a frequency resolution of 0.01 Hz will permit a worst case phase error of 0.06 radians to accrue. This is consistent with the phase noise given above. The number of bits required to control the NCO is therefore defined as:

$$\log_2(20.10^3/0.01) \approx 21 \text{ bits.}$$

The NCO must also be clocked at a sufficiently high rate to prevent jitter on the phase ramp output occurring. This jitter is produced as a consequence of the oscillator only producing a finite number of output samples per output cycle. The problem is therefore worst at the highest output frequency. In order to reduce this effect to the level of the phase quantisation, therefore, approximately 64 output samples per output cycle will be required. This corresponds to a clocking rate of 640 kHz.

Positioning of the phase rotator after some accumulation of the correlator output is acceptable provided that no appreciable Doppler loss occurs during that accumulation time. The loss may be easily evaluated by examining the accumulator frequency response, $F(\omega)$, thus:

$$F(\omega) = \frac{1}{N} \sum_{i=1}^{N} e^{ij\omega T} = \frac{\sin \frac{N\omega T}{2}}{N \sin \frac{\omega T}{2}}$$

For a maximum 1 dB loss therefore, at the maximum Doppler frequency of 10 kHz, N may be no greater than 547. Putting the phase rotator after this amount of accumulation would result in the throughput rate of the device being reduced from 20 MHz to approximately 40 kHz. Further accumulation may then be used to reduce the output data rate to a sufficiently low value for handling by a microprocessor. This would be in the order of 1 kHz. There is however one further aspect of the configuration to be examined, that is, the required I and Q word-lengths.

The number of bits required for the I and Q digitisations will be application dependent. If a 2 dB loss can be tolerated then single bit conversion will be adequate. However if 2 bits are used this loss will be reduced to 0.6 dB. These two cases assume that the signal to noise ratio is negative. As progression is made through the accumulation stages this will not always be the case and more bits will become necessary.

The point at which phase rotation is effected therefore will depend on the implementation of the device. A 2 bit rotator operating at 20 MHz may be placed directly before or after the correlator. Alternatively a slower but greater word length rotator may be used after a limited amount of post correlation accumulation.

The phase rotator 53 comprises logic multipliers 54 and summers 55. Each of the digitised I & Q signals is separately multiplied by $\cos\omega T$ and $\sin\omega T$, which are themselves derived from a read-only-memory (ROM) 56 to which the NCO output word is applied. The multiplier outputs $I \cos\omega T$ and $Q \sin\omega T$ are summed to give a corrected vector $I^1$, likewise $Q \cos\omega T$ and $I \sin\omega T$ are summed to give $Q^1$. $I^1$ and $Q^1$ are then subjected to further, post phase rotation accumulation in accumulators 57a, 57b before being input to the channel processor (not shown). The primary function of the channel processor is to maintain track of the code and carrier phases.

Estimates of code position error may be made simply by differencing early and late correlation samples. These are derived by performing $I^2 + Q^2$ operations on early and late correlation outputs. It may be noted that in a digital implementation channel balance will no longer be a problem. The code position error estimates may then be applied to a software loop filter before being used to update the code generator (not shown), hence closing the code tracking loop.

Carrier phase estimates may be made by using a Costas I.Q. technique on the prompt correlation samples. The carrier loop will then be closed in a similar manner to the code loop. Carrier frequency estimates may also be made by performing an operation on time sequential I,Q pairs as shown below:

$$\text{Error frequency} \propto \frac{Q_i I_{i-1} - I_i Q_{i-1}}{I_i^2 + Q_i^2}$$

This error function may be used to assist initial carrier phase acquisition and may also be employed to give frequency estimates when severe jamming precludes use of the carrier phase tracking loop.

This configuration allows the addition of more receiver channels simply by the addition of extra code generators, N.C.O's and PROMS. The same A/D module and channel processor may be used for the extra channels. A separate A/D conversion module will, however, be required if L1 and L2 are to be received simultaneously.

For a lower performance receiver channel the adaptive threshold 2 bit A/D converters may be replaced with single bit units. The correlator need only be a switched early/late type and so only requiring a single pair of I and Q outputs.

If simultaneous operation on a number of satellites, or on different signal segments of the same satellite is required, a number of the serial correlation blocks can be used in parallel.

We claim:

1. A receiver for a Navstar satellite navigation system including amplification and down conversion to i.f. frequencies to produce quadrature signals, analogue-to-digital converters to digitise separately the quadrature signals, local digital code generating means, means for correlating the digitised quadrature signals separately with the same locally generated digital codes, channel signal processing means to which the outputs of the correlation means are applied, the processing means being arranged to control the code and carrier tracking of the receiver, and correction means responsive to control signals generated in the processing means to effect phase rotation of the baseband signal phasor represented by the digitised quadrature signals to effect Doppler tracking in the receiver loop, the correction means including means for generating digital signals representing $\sin\omega T$ and $\cos\omega T$, where $\omega T$ is the required phase rotation angle, means for multiplying each of the quadrature signals by the $\sin\omega T$ and $\cos\omega T$ signals separately and means for summing the multiplied signals according to the algorithm $$I^1 = I \cos\omega T + Q \sin\omega T$$

$$Q^1 = Q \cos\omega T - I \sin\omega T$$

where I and Q are the digitised quadrature signals.

2. A receiver according to claim 1 wherein the means for generating the digital signals representing $\sin\omega T$ and $\cos\omega T$ comprises a numerically controlled oscillator (NCO) to which a digital signal representative of the phase rotation frequency required to effect Doppler tracking is applied, the output of the oscillator being a digital representation of a phase angle $\omega T$ applied to a read-only memory (ROM) containing values of $\sin\omega T$ and $\cos\omega T$ for different phase angles $\omega T$.

3. A receiver according to claim 2 wherein the numerically controlled oscillator (NCO) comprises a clocked shift register acting as an accumulator to which is fed a digital word representing the phase rotation frequency, the output phase rotation angle being a shorter digital word taken from intermediate stages of the accumulator.

4. A receiver according to claim 1 wherein the receiver further includes partial accumulation means for the correlated I & Q digitised quadrature signals preceding the correction means and further accumulation means for the I' and Q' signal outputs of the correction means.

5. A receiver according to claim 2 wherein the receiver further includes partial accumulation means for the correlated I & Q digitised quadrature signals preceding the correction means and further accumulation means for the I' and Q' signal outputs of the correction means.

* * * * *